(12) United States Patent
Ohtsuka

(10) Patent No.: US 6,561,950 B1
(45) Date of Patent: May 13, 2003

(54) CONTROL DEVICE FOR A SYNCHROMESH AUTOMATIC TRANSMISSION

(75) Inventor: Toshio Ohtsuka, Kobe (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/613,715

(22) Filed: Jul. 11, 2000

(30) Foreign Application Priority Data

Apr. 25, 2000 (JP) ........................ 2000-124792

(51) Int. Cl.[7] .................... F16H 59/30; F16H 59/00
(52) U.S. Cl. ......................... 477/124; 74/335
(58) Field of Search .................. 74/335, 336 R, 74/339, 471 XY, 473 R; 477/116, 174, 175, 110, 111, 124

(56) References Cited

U.S. PATENT DOCUMENTS

| | | | | |
|---|---|---|---|---|
| 4,627,312 A | * | 12/1986 | Fujieda et al. | 74/336 R X |
| 4,825,993 A | | 5/1989 | Kurihara et al. | |
| 5,048,372 A | * | 9/1991 | Sodeno et al. | 477/111 X |
| 5,050,079 A | * | 9/1991 | Steeby | 74/866 X |
| 5,138,905 A | * | 8/1992 | Kouno | 74/335 |
| 5,167,311 A | * | 12/1992 | Satoh et al. | 74/335 X |
| 5,219,391 A | * | 6/1993 | Edelen et al. | 74/335 |
| 5,413,012 A | * | 5/1995 | Davis | 477/124 X |
| 5,425,284 A | * | 6/1995 | Davis | 477/124 X |
| 5,441,463 A | * | 8/1995 | Steeby | 477/79 |
| 5,685,799 A | * | 11/1997 | Vukovich et al. | 477/61 |
| 5,921,135 A | * | 7/1999 | Friedrich et al. | 74/335 |
| 5,974,354 A | * | 10/1999 | Janecke et al. | 477/124 X |
| 5,974,906 A | * | 11/1999 | Stine et al. | 477/124 X |
| 6,006,621 A | * | 12/1999 | Imao et al. | 74/336 R |
| 6,035,734 A | * | 3/2000 | Le Van | 74/335 |
| 6,095,003 A | * | 8/2000 | Genise | 74/335 |
| 6,105,448 A | | 8/2000 | Borschert et al. | |
| 6,227,063 B1 | * | 5/2001 | Ohmori et al. | 74/335 |

FOREIGN PATENT DOCUMENTS

| | | | |
|---|---|---|---|
| DE | 690 07 458 T2 | 3/1994 | |
| DE | 197 09 419 A1 | 10/1997 | |
| EP | 0 326 119 | 8/1989 | |
| EP | 0373273 | * 6/1990 | .............. 74/335 |
| JP | 63-270252 | 11/1988 | .......... B60K/41/02 |

OTHER PUBLICATIONS

German Patent Office Action of Oct. 12, 2001, with translation of relevant portions.

* cited by examiner

*Primary Examiner*—Rodney H. Bonck
*Assistant Examiner*—Roger Pang
(74) *Attorney, Agent, or Firm*—Sughrue Mion, PLLC

(57) ABSTRACT

A control device for a synchromesh automatic transmission includes: an input shaft driven by a combustion engine; an output shaft coupled to the input shaft by gears; a plurality of groups of transmission gears having different gear ratios and interposed between the input shaft and the output shaft; sleeve gears coupling any one of the transmission gears with the output shaft; a shifting and selecting actuator operating the sleeve gears; a shifting and selecting position sensor detecting control inputs in a shifting direction and a selecting direction; and a control unit instructing operations of the above components, wherein the control unit judges whether or not a position of completing the operations is within a range of a target position based on an output from the shifting and selecting position sensor at a time of finishing the gear changing operation.

1 Claim, 6 Drawing Sheets

CONTROL DEVICE FOR A SYNCHROMESH AUTOMATIC TRANSMISSION

BACKGROUND OF THE INVENTION

1. Field of the Invention

The present invention relates to a control device for a synchromesh automatic transmission, by which a gear can be securely changed to an aimed gear position.

2. Discussion of Background

As a control device for a synchromesh automatic transmission, used for vehicles, is disclosed in, for example, Japanese Unexamined Patent Publication JP-A-63-270252. A technique disclosed therein is that a combustion engine and a synchromesh automatic transmission are coupled through an electromagnetic clutch; a throttle opening degree is controlled so as to maintain a degree of change between a rotational speed of the combustion engine at time of releasing the electromagnetic clutch and a rotational speed of the combustion engine at time of recoupling the electromagnetic clutch upon switching of transmission gears within a predetermined range; and a control input is corrected by a learning routine, conducted by each gear changing operation to deal with scattering and various conditions of the combustion engine, whereby a shock, caused at time of changing the gears, is relaxed.

In a shifting device, changing the gear of the transmission, according to the conventional technique, a pair of three-position oil pressure cylinders, controlling a shifting and selecting lever respectively in an axial direction and a rotational direction is used. By actuating the three-position oil pressure cylinder for selecting, shift rods are selected, and by actuating the three-position oil pressure cylinder for shifting, the selected shift rod is moved to switch a gear position. Other than the shifting device of the oil pressure type, an electromotive synchromesh automatic transmission for actuating the shifting and selecting operations using two motors is also generally used. In such an electromotive synchromesh automatic transmission, a gear position is switched such that a sleeve gear to be operated is selected by a selecting motor controlling a position by a selecting position sensor, and the sleeve gear is moved to be engaged with an aimed gear by the shifting motor controlling a shifting position by a shifting position sensor.

However, in this synchromesh automatic transmission, a control unit, receiving a feed-back from the position sensors, controls the shifting position and a selecting position. Therefore, when the control unit or a system is erroneously operated to cause a situation that the aimed gear is not engaged and the electromagnetic clutch is coupled in a state that a gear different from the aimed gear is engaged, a shock occurs by an abrupt engine brake caused by an erroneous gear change, knocking of the engine occurs by an insufficient acceleration, or a traffic accident may be caused by an operation erroneously selecting forward gear positions and a backward gear position in an extreme case.

SUMMARY OF THE INVENTION

It is an object of the present invention to solve the above-mentioned problems inherent in the conventional technique and to provide a control device for a synchromesh automatic transmission, which can be stably operated without erroneous operations.

According to a first aspect of the present invention, there is provided a control device for a synchromesh automatic transmission comprising:

an input shaft coupled to a crank shaft of a combustion engine through a clutch mechanism;

an output shaft coupled to the input shaft by gears;

a plurality of groups of transmission gears, having different gear ratios and interposed between the input shaft and the output shaft;

a coupling mechanism selectively coupling one of the plurality of groups of the transmission gears with the output shaft;

a shifting and selecting actuator operating the coupling mechanism in shifting and selecting directions;

a shifting position sensor detecting a control input in the shifting direction by the shifting and selecting actuator;

a selecting position sensor detecting a control input in the selecting direction by the shifting and selecting actuator; and a control unit instructing an operation to the shifting and selecting actuator, wherein the control unit detects a position of completing the operation from outputs from the shifting and selecting position sensors after finishing a gear changing operation, and judges whether or not the position of completing the operation is within a range of target position in order to finish the operation.

According to a second aspect of the present invention, there is provided a control device for a synchromesh automatic transmission comprising:

an input shaft coupled to a crank shaft of a combustion engine through a clutch mechanism;

an output shaft coupled to the input shaft by gears;

a plurality of groups of transmission gears having different gear ratios and interposed between the input shaft and the output shaft;

a coupling mechanism selectively coupling one of the plurality of groups of the transmission gears with the output shaft;

a shifting and selecting actuator operating the coupling mechanism in shifting and selecting directions;

an input shaft rotational speed sensor detecting a rotational speed of the input shaft;

an output shaft rotational speed sensor detecting a rotational speed of the output shaft; and a control unit instructing an operation to the shifting and selecting actuator, wherein the control unit calculates a target ratio of rotational speeds of the input shaft and the output shaft from a gear ratio of transmission gears, which are newly engaged after finishing a gear changing operation, judges whether or not the rotational speed ratio obtained from outputs of the input shaft rotational speed sensor and the output shaft rotational speed sensor is within the target rotational speed ratio, and makes the operation complete.

According to a third aspect of the present invention, there is provided a control device for a synchromesh automatic transmission comprising:

an input shaft coupled to a crankshaft of a combustion engine through a clutch mechanism;

an output shaft coupled to the input shaft by gears;

a plurality of groups of transmission gears having different gear ratios and interposed between the input shaft and the output shaft, and one of the groups of the transmission gears is for a reverse driving;

a coupling mechanism selectively coupling one of the plurality of groups of the transmission gears with the output shaft;

a shifting and selecting actuator operating the coupling mechanism in shifting and selecting directions;

a reverse driving detecting means detecting an incident that the coupling mechanism is coupled with transmission gears for the reverse driving;

a control unit instructing an operation to the shifting and selecting actuator; and a shifting lever, through which an operator transmits operating conditions to the control unit, wherein the control unit compares an instruction signal by the shifting lever with a detecting signal from the reverse driving detecting means after finishing a gear changing operation, and judges whether or not the instruction signal and the detecting signal match, and finishes the operation.

According to a fourth aspect of the present invention, there is provided the control device for the synchromesh automatic transmission, wherein when the control unit judges that the position of completing the operation is not within the range of target position, the gear changing operation is repeated.

According to a fifth aspect of the present invention, there is provided the control device for the synchromesh automatic transmission, wherein when the control unit judges that the rotational speed ratio is not within the range of the target rotational speed ratio, the gear changing operation is repeated.

According to a sixth aspect of the present invention, there is provided the control device for the synchromesh automatic transmission, wherein when the control unit judges that the instruction signal from the shifting lever does not match the detecting signal from the reverse driving detecting means, the gear changing operation is repeated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 7 as follows, wherein the same numerical references are used for the same or similar portions and description of these portions is omitted.

Embodiment 1

Figure 1:
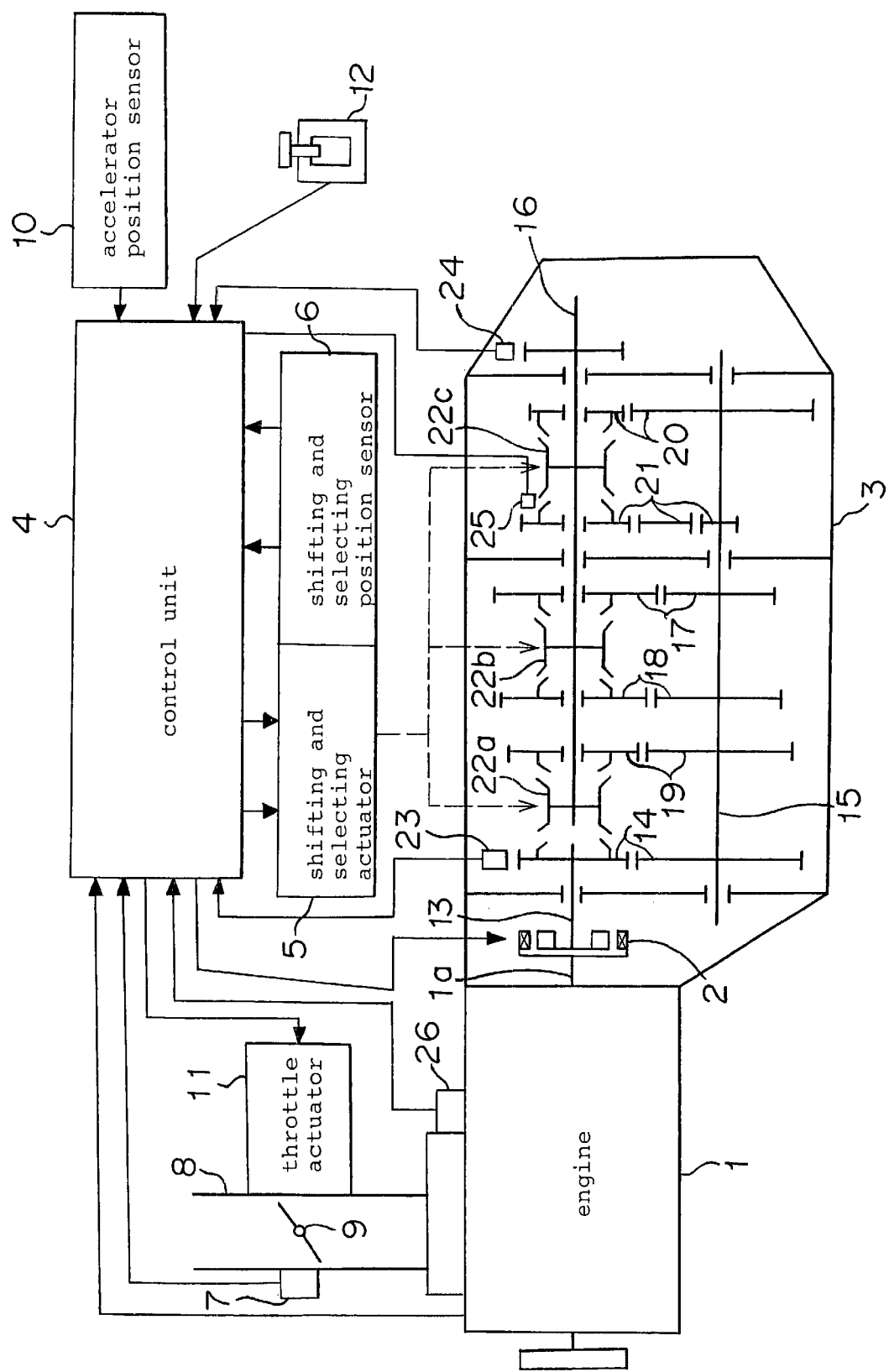
FIG. 1 is a block chart illustrating a structure of a control device for a synchromesh automatic transmission according to Embodiment 1 of the present invention.
Figure 2:
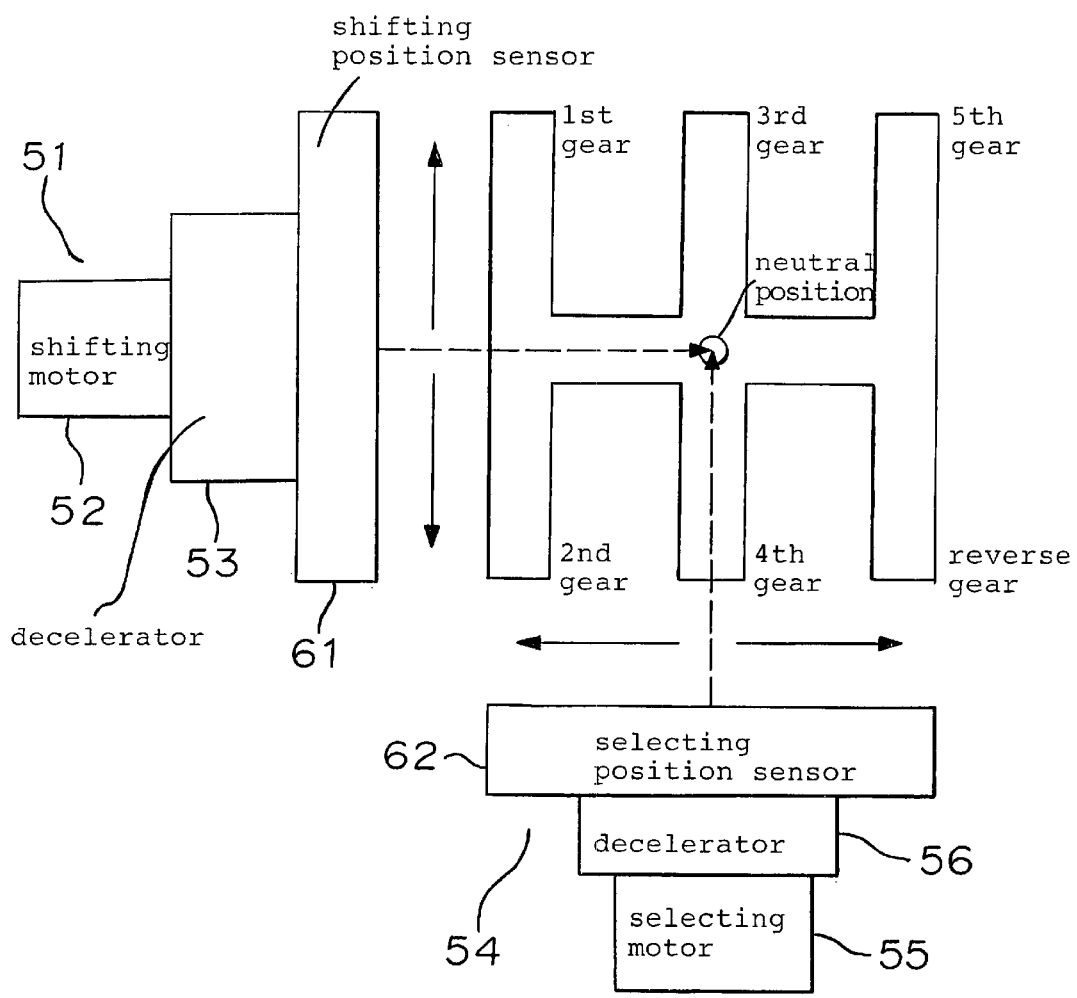
FIG. 2 illustrates a structure of a transmission of the control device for the synchromesh automatic transmission according to Embodiment 1 of the present invention.
Figure 3:
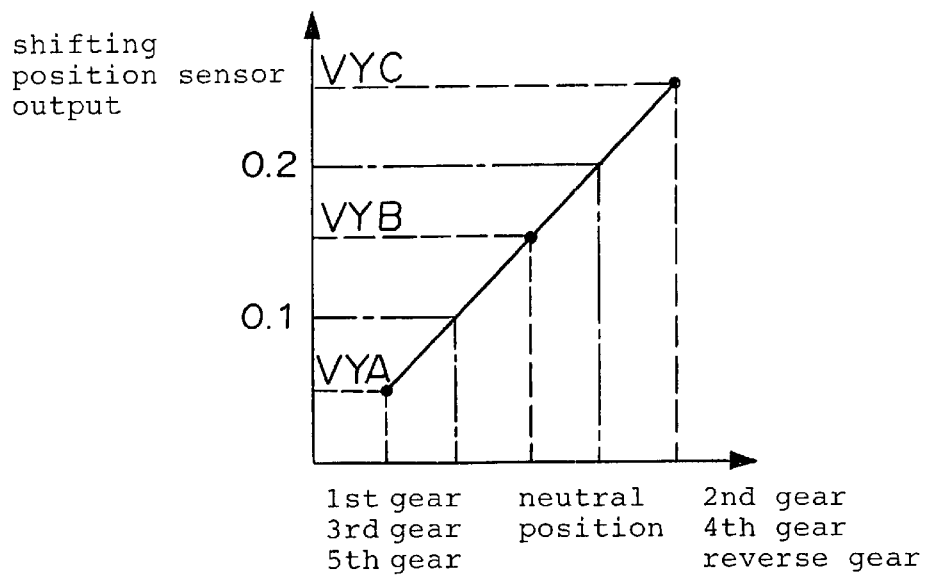
FIG. 3 is a graph illustrating an operation of the control device for the synchromesh automatic transmission according to Embodiment 1 of the present invention.
Figure 4:
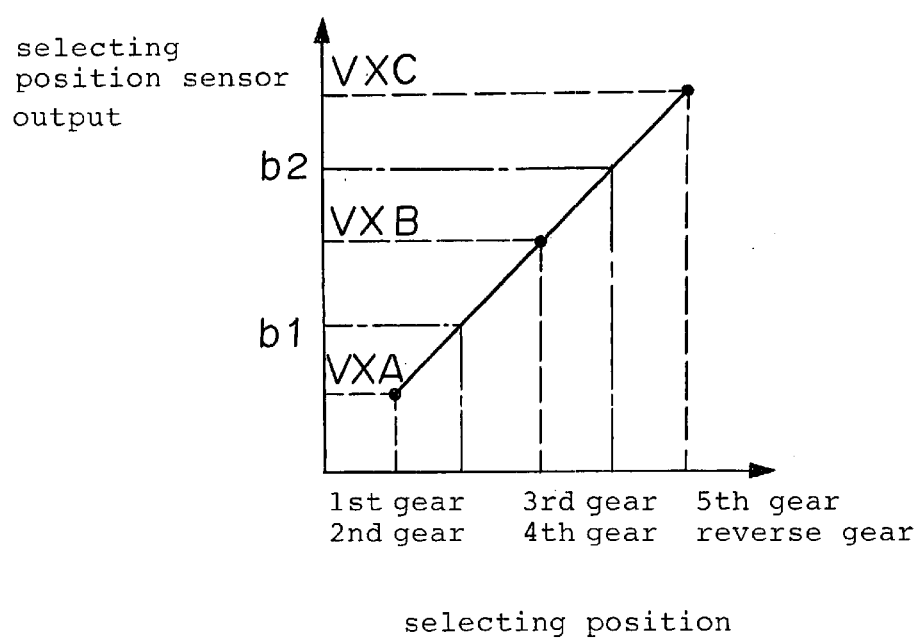
FIG. 4 is a graph illustrating an operation of the control device for the synchromesh automatic transmission according to Embodiment 1 of the present invention.
Figure 5:
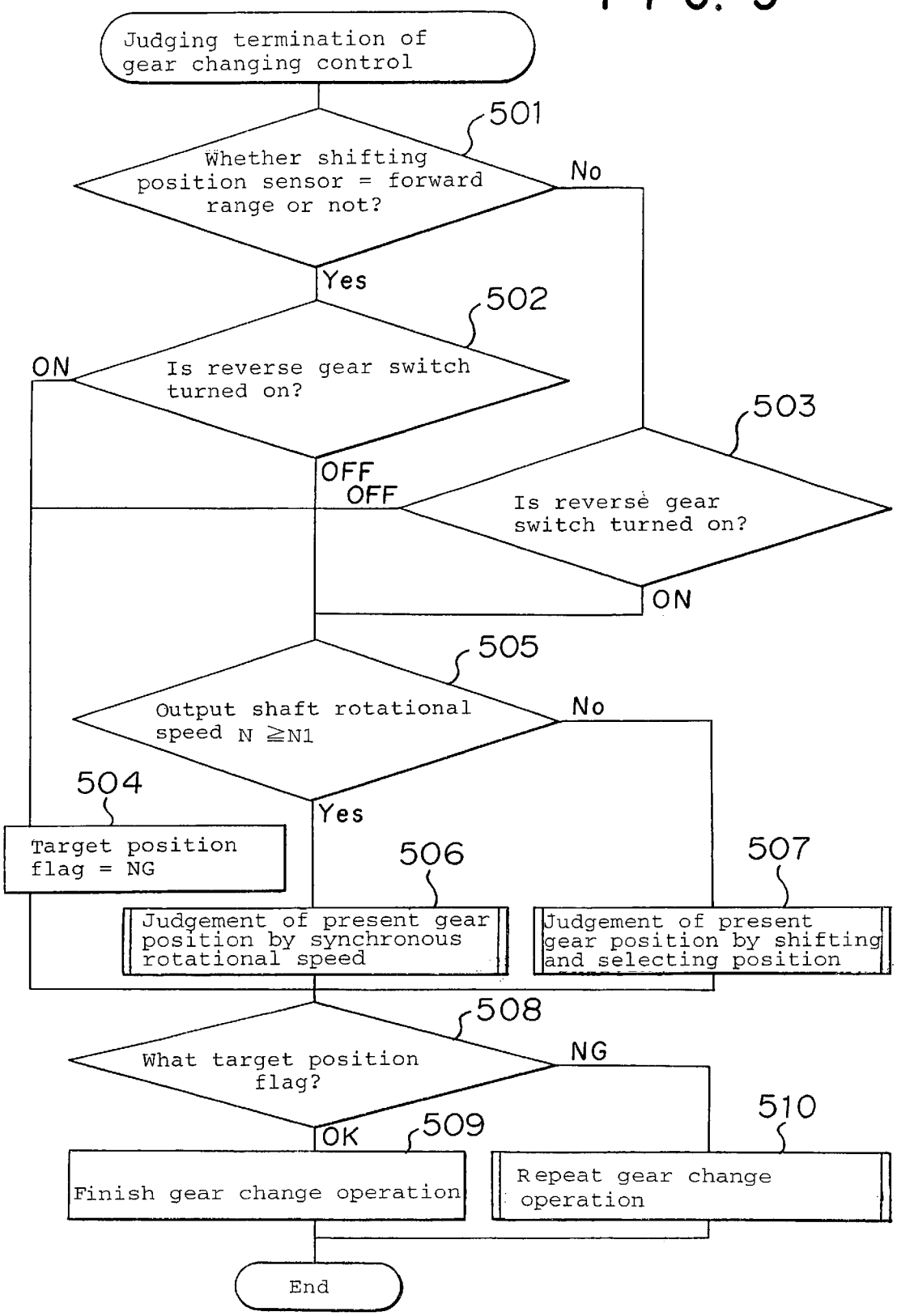
FIG. 5 is a flow chart illustrating the control device for the synchromesh automatic transmission according to Embodiment 1 of the present invention.
Figure 6:
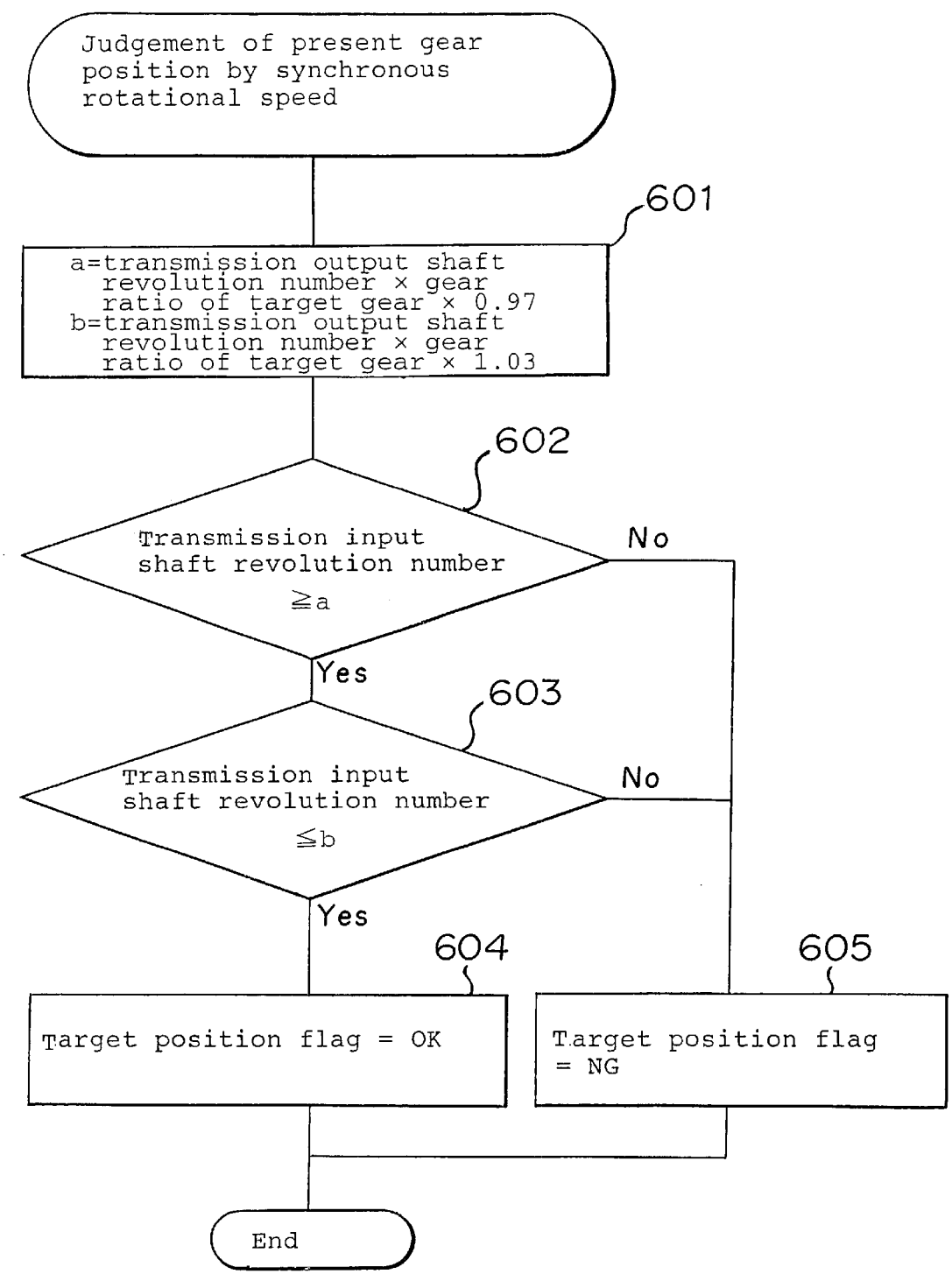
FIG. 6 is a flow chart illustrating the operation of the control device for the synchromesh automatic transmission according to Embodiment 1 of the present invention.
Figure 7:
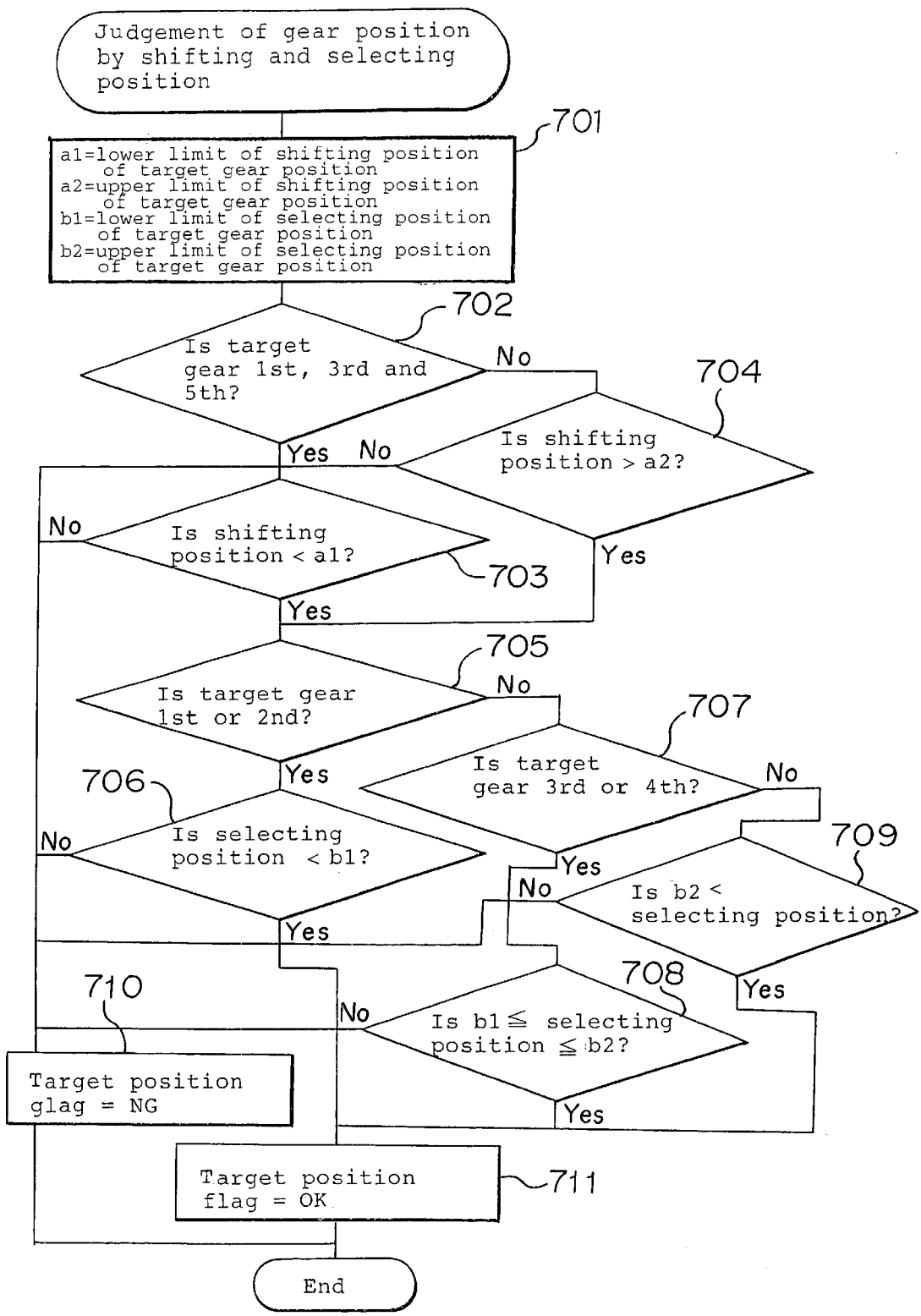
FIG. 7 is a flow chart illustrating the operation of the control device for the synchromesh automatic transmission according to Embodiment 1 of the present invention.

FIGS. 1 through 7 illustrate a structure and operations of a control device for a synchromesh automatic transmission according to Embodiment 1 of the present invention. FIG. 1 is a block chart illustrating a structure of a transmission. FIG. 2 explains the structure of the transmission. FIGS. 3 and 4 are graphs illustrating the operations. FIGS. 5 through 7 are flow charts illustrating a controlling operation. In FIG. 1, numerical reference 1 designates a combustion engine equipped in a vehicle; numerical reference 2 designates an electromagnetic clutch, located in a crank shaft 1a of the combustion engine 1 and coupling the combustion engine 1 with the synchromesh automatic transmission 3; numerical reference 4 designates a control unit controlling the automatic transmission 3; numerical reference 5 designates a shifting and selecting actuator controlled by the control unit 4 and operating an engagement of gears of the automatic transmission 3, to be described below; and numerical reference 6 designates a shifting and selecting position sensor detecting a moving position of the shifting and selecting actuator 5.

Numerical reference 7 designates a throttle position sensor detecting an opening degree of a throttle valve 9, positioned in an intake air passage 8 of the combustion engine 1; numerical reference 10 designates an accelerator position sensor detecting an amount of stepping an accelerator pedal (not shown); numerical reference 11 designates a throttle actuator controlling the opening degree of the throttle valve 9 in response to an output from the accelerator position sensor 10 or by an operation of the control unit 4 according to a predetermined program at time of changing gears; and numerical reference 12 designates a shifting lever instructing the control unit 4 a shifting position, operated by a driver.

The automatic transmission 3 comprises: an input shaft 13 coupled to the electromagnetic clutch 2; a countershaft 15 coupled to the input shaft 13 by a primary gear set 14; an output shaft driving the vehicle; a first gear set 17, a second gear set 18, a third gear set 19, a fifth gear set 20, and a reverse gear set 21 respectively located between the countershaft 15 and the output shaft 16 as paired gears; and sleeve gears 22a, 22b, and 22c being a coupling mechanism, fixed to the output shaft 16 in a rotational direction and equipped to be movable in an axial direction. Gears on a side of the countershaft 15 of the gear sets 17, 18, 19, 20, and 21 are fixed to the countershaft 15, and gears on a side of the output shaft 16 are equipped in the output shaft 16 so as to be rotatable, wherein the gears on the side of the output shaft 16 are individually fixed to the output shaft 16 by engagements with the sleeve gears 22a, 22b, and 22c.

Numerical reference 23 designates an input shaft rotational speed sensor detecting a rotational speed of the input shaft 13; numerical reference 24 designates an output shaft rotational speed sensor detecting a rotational speed of the output shaft; numerical reference 25 designates a reverse gear switch detecting an engagement between the sleeve gear 22c and the reverse gear set 21; and numerical reference 26 designates a combustion engine rotational speed sensor detecting a rotational speed of the combustion engine 1. Further, the electromagnetic clutch 2 generates a transmitting torque in proportional to an exciting current, and transmits or shuts down a motive power between the crankshaft 1a of the combustion engine and the input shaft 13 of the automatic transmission 3 by a control of the control unit 4.

FIG. 2 schematically illustrate a summary of an operation of the automatic transmission 3 by the shifting and selecting actuator 5. The shifting and selecting actuator 5 includes a shifting actuator 51 and the selecting actuator 54. The shifting actuator 51 comprises a shifting motor 52 and a decelerator 53, and shifts the sleeve gears 22a, 22b, and 22c on a side of the first, third, and fifth gears, a neutral position, and a side of the second, fourth, and reverse gears while detecting a shifting position by a shifting position sensor. Further, the selecting actuator 54 includes a selecting motor 55 and a decelerator 56, and selects the sleeve gears 22a, 22b, and 22c detecting a selecting position by a selecting position sensor 62.

The gear sets 17, 18, 19, and 20 of the automatic transmission 3 is for a forward driving, wherein the gear sets have different gear ratios. In Embodiment 1, an example that five stages of the forward driving and one stage of a reverse driving are used. The sleeve gears 22a, 22b, and 22c individually fixing the gear sets 17, 18, 19, 20, and 21 to the output shaft 16. The sleeve gear 22a is interposed between the primary gear set 14 and the third gear set 19. The sleeve gear 22b is interposed between the first gear set 17 and the second gear set 18. The sleeve gear 22c is interposed between the fifth gear set 20 and the reverse gear set 21. One of the sleeve gears 22a, 22b, and 22c is selected by the selecting actuator 54, and the one is transferred on either side by the shifting actuator 51, whereby one of the first through fifth forward gears, the reverse gear, and the neutral position is selected. In a structure illustrated in FIG. 1, a fourth gear position is realized by coupling the primary gear set 14 with the FIG. 3 illustrates a relationship between the shifting position obtained by the shifting position sensor 61 and an output voltage. FIG. 4 illustrates a relationship between the selecting position obtained by the selecting position sensor 62 and the output voltage. The shifting position sensor 61 outputs a voltage VYA when the sleeve gears 22a, 22b, and 22c is on the side of the first, third, and fifth gears, wherein, the voltage VYA is a voltage of a target position at time of controlling shifting by the control unit. In a similar manner thereto, in the neutral position, a voltage VYB is outputted from the shifting position sensor 61. Further, when the sleeve gears are on the side of the second, fourth, and reverse gears, a voltage VYC is the output voltage from the shifting position sensor 61, being the voltage of the target position at time of controlling shifting. Further, in the selecting position sensor 62, an output and the voltage of the target position is VXC at time of selecting the sleeve gear 22c. A voltage VXB is the output and the voltage of the target position at time of selecting the sleeve gear 22a, switching the third and fourth gears. A voltage VXA is the output and the voltage of the target position at time of selecting the sleeve gear 22b, switching the first and second gears.

A gear changing operation by the control unit 4 is performed by inputting the position signal of the shifting lever 12, the signal from the accelerator position sensor 10, and rotational speed signals from the input shaft rotational speed sensor 23, the output shaft rotational speed sensor 24, and combustion engine rotational speed sensor 26, by determining the gear suitable for a driving condition based on a shifting pattern, memorized in the control unit 4, and by operating the shifting and selecting actuator 5 detecting the shifting and selecting positions by the shifting and selecting position sensor 6.

In this operation, at first, the automatic transmission 3 is turned off by cutting the excitation current of the electromagnetic clutch 2, the sleeve gears 22a, 22b, 22c are selected by instructing the shifting and selecting actuator 5 to operate, and a gear set or the above determined gear is coupled after releasing a present coupling of gear set. When the shifting and selecting position sensor 6 detects a completion of the coupling, the electromagnetic clutch 2 is coupled again. In this procedure, the throttle actuator 11 is operated simultaneously with the cutting off of the excitation current of the electromagnetic clutch 2, whereby the throttle valve 9 is throttled. When the electromagnetic clutch 2 is coupled again, the throttle valve 9 is opened to a predetermined position by the output signals from the combustion engine rotational speed sensor 26 and the output shaft rotational speed sensor 24.

In the control device for the synchromesh automatic transmission according to Embodiment 1 having the above-mentioned structure and operation, an example of a gear changing control by the control unit 4 is described in reference of a flow chart of FIG. 5. When the control unit 4 judges that a control of switching the gears based on the shifting pattern is completed, in other words, when predetermined sleeve gears 22a, 22b, and 22c are transferred to predetermined positions, the following judgment and control are conducted before recoupling the electromagnetic clutch 2. In Step 501, it is judged whether or not the shifting position is in a forward range based on an output value from the shifting and selecting position sensor 6. When it is judged to be in the forward range, Step 502 is selected to judge turning-on or turning-off of the reverse gear switch 25.

When the shifting position is judged in a reverse range in Step 501, Step 503 is selected to judge turning-on or turning-off of the reverse gear switch 25 in a similar manner to that in Step 502. Cases that the reverse gear switch 25 is turned on in Step 502 based on the judgment of the forward range in Step 501 and that reverse gear switch 25 is turned on in Step 503 based on the judgment of the reverse range in Step 501 mean erroneous operations. In both of the cases, Step 504 is selected to set a target position flag NG. When a normal operation is judged in Steps 502 and 503, Step 505 is processed.

In Step 505, the rotational speed N of the output shaft 16 of the automatic transmission 3 is read out of an output from the output shaft rotational speed sensor 24, and it is judged whether or not the rotational speed N is larger than a predetermined rotational speed N1. If N≧N1, Step 506 is processed. If N≦N1, Step 507 is processed. Step 506 judges a present gear position by comparing the rotational speeds of the input shaft 13 and the output shaft as described below in reference of FIG. 6. Step 507 judges that the present gear position based on a range of the output voltage from the shifting and selecting position sensor 6 as described below in reference of FIG. 7.

An operation of Step 506 will be described in reference of FIG. 6. When N≧N1, synchronous rotational speed criteria values a and b are operated in Step 601 in FIG. 6, for example, as follows:

a=output shaft rotational speed N of automatic transmission 3×gear ratio of target gears×0.97; and b=output shaft rotational speed N of automatic transmission 3×gear ratio of target gears×1.03 In Steps 602 and 603, the rotational speed of the input shaft 13 of the automatic transmission 3 is respectively compared with the criteria values a and b, wherein the rotational speed of the input shaft 13 is the output from the input shaft rotational speed sensor 23.

In Step 602, when input shaft rotational speed of automatic transmission≧a, Step 603 is processed. In Step 603, when input shaft rotational speed of automatic transmission≦b, Step 604 is processed to set OK in the target position flag. If conditions of input shaft rotational speed of automatic transmission≧a in Step 602 and input shaft rotational speed of automatic transmission≦b in Step 603 are not established, Step 605 is processed to set NG in the target position flag. In other words, the rotational speeds of the input shaft 13 and the output shaft 16 of the automatic transmission 3 are compared, and when a ratio of error is within 3% in consideration of the gear ratios, it is judged that predetermined gear positions are realized.

In the next, an operation of Step 507 in FIG. 5 will be described in reference of FIG. 7. When N≦N1 in Step 505 of FIG. 5 is established, criteria values for the shifting position and the selecting position of newly coupled gears are determined in Step 701 of FIG. 7 as follows:

a1=criteria value for shifting position in first, third, and fifth gears;

a2=criteria value for shifting position in second, fourth, and reverse gears;

b1=criteria value for selecting position of first and second gears; and b2=criteria value for selecting position of fifth and reverse gears, wherein the criteria values for the shifting and selecting positions in an aimed gear position.

In Step 702, the target gear is judged. If the target gear is the first gear or the second gear, Step 703 is processed. If shifting position<a1 is satisfied in Step 703, the shifting position is judged normal, and Step 705 is processed to judge the selecting position. If the target gear is judged the second, fourth, or reverse gear, not the first, third, or gear, in Step 702, Step 704 is processed. If shifting position>a2 is satisfied in Step 704, the shifting position is judged normal, and Step 705 is processed to judge the selecting position. If shifting position<a1 in Step 703 or shifting position>a2 in Step 704 is not satisfied, Step 710 is processed to set NG in the target position flag.

If the target gear position is judged the first or second gear in Step 705, Step 706 is processed. If selecting position<b1 is satisfied in Step 706, the selecting position is judged normal, and Step 711 is processed to set OK in the target position flag. If the target gear position is not the first or second gear in Step 705, Step 707 is processed to judge the target gear. If the target gear is the third or fourth gear in Step 707, Step 708 is processed. In Step 708, if b1≦selecting position≦b2 is satisfied, the selecting position is judged normal, and Step 711 is processed to set OK in the target position flag. If the target gear is not the third or fourth gear in Step 707, Step 709 is processed. When b2<selecting position is satisfied in Step 709, the selecting position is judged normal, and Step 711 is processed to set OK in the target position flag.

If selecting position<b1 in Step 706, b1≦selecting position≦b in Step 708, or b2<selecting position in Step 709 is not satisfied, Step 710 is processed to set NG in the target position flag.

In the next, the process returns to FIG. 5. After processing Step 504, Step 506, or Step 507, Step 508 is processed to check the target position flag. If the flag shows OK, Step 509 is processed to finish changing of the gears and to couple the electromagnetic clutch 2. If the flag shows NG in Step 508, Step 510 is processed to change the gears again, and Step 501 is processed to reconfirm the gear change. In other words, when the forward or reverse gears are erroneously operated in Steps 501 through 503, or the positions of the gears are erroneously changed in Steps 505 to 507, the flag shows NG. Then, the gear changing operation is again conducted in Step 510 until the flag shows OK.

In the above routine, because the judgment of output shaft rotational speed N of automatic transmission 3≧N1 in Step 505 is apt to cause errors in the output from the rotational speed sensor and in the operation under a low rotational speed range, the judgment is separated to that for a synchronous rotation at a high speed range and that by the position sensor at a low speed range. In case that the output from the rotational speed sensor has no problem, it is possible to select either judgment in all rotational speed ranges, or use both judgments regardless of the rotational speed from the output shaft.

The first advantage of the control device for the synchromesh automatic transmission according to the present invention is that the gears are securely changed.

The second advantage of the control device for the synchromesh automatic transmission according to the present invention is that a shock and so on are not caused at time of changing the gears.

The third advantage of the control device for the synchromesh automatic transmission according to the present invention is that a danger of changing to other than an aimed gear position can be avoided.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2000-124792 filed on Apr. 25, 2000 including specification, claims, drawings and summary are incorporated herein by reference in its entirety.

What is claimed is:

1. A control device for a synchromesh automatic transmission comprising:

an input shaft coupled to a crankshaft of a combustion engine through a clutch mechanism;

an output shaft coupled to the input shaft;

a plurality of groups of transmission gears having different gear ratios and interposed between the input shaft and the output shaft;

a coupling mechanism selectively coupling one of the plurality of groups of the transmission gears and the output shaft;

a shifting and selecting actuator operating the coupling mechanism in shifting and selecting directions;

an input shaft rotational speed sensor detecting a rotational speed of the input shaft;

an output shaft rotational speed sensor detecting a rotational speed of the output shaft;

a control unit commanding an operation of the shifting and selecting actuator, and a shifting and selecting position sensor, wherein the control unit calculates a target ratio of the rotational speeds of the input shaft and the output shaft from a gear ratio of transmission gears, which are newly engaged after finishing a gear changing operation, judges whether or not a rotational speed ratio obtained from outputs of the input shaft rotational speed sensor and the output shaft rotational speed sensor is within the target rotational speed ratio, and makes the operation complete, wherein when the control unit judges that the rotational speed ratio is not within the range of the target rotational speed ratio, the gear changing operation is repeated, wherein when the rotational speed of the output shaft is greater than or equal to a predetermined value, a present gear position is determined by comparing the rotational speed of the input shaft with the rotational speed of the output shaft, and wherein when the rotational speed of the output shaft is less than the predetermined value, the present gear position is determined by a shifting and selecting position obtained from the shifting and selecting position sensor.

* * * * *